July 29, 1969    L. M. BURROWS    3,458,172
BALL VALVE

Filed May 26, 1966    3 Sheets-Sheet 1

INVENTOR
Lewis M. Burrows
BY Robert W. Mayer
   ATTORNEY

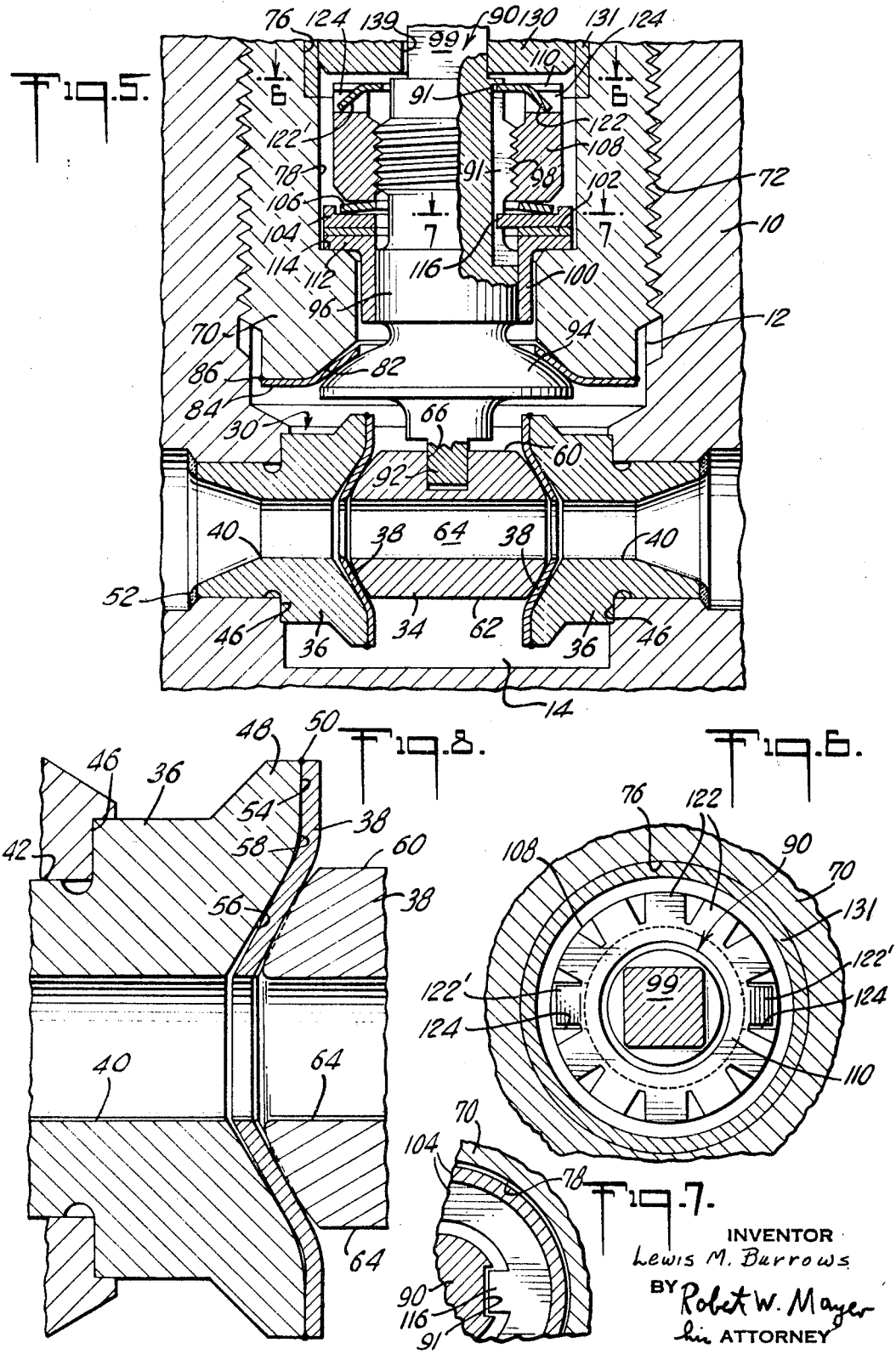

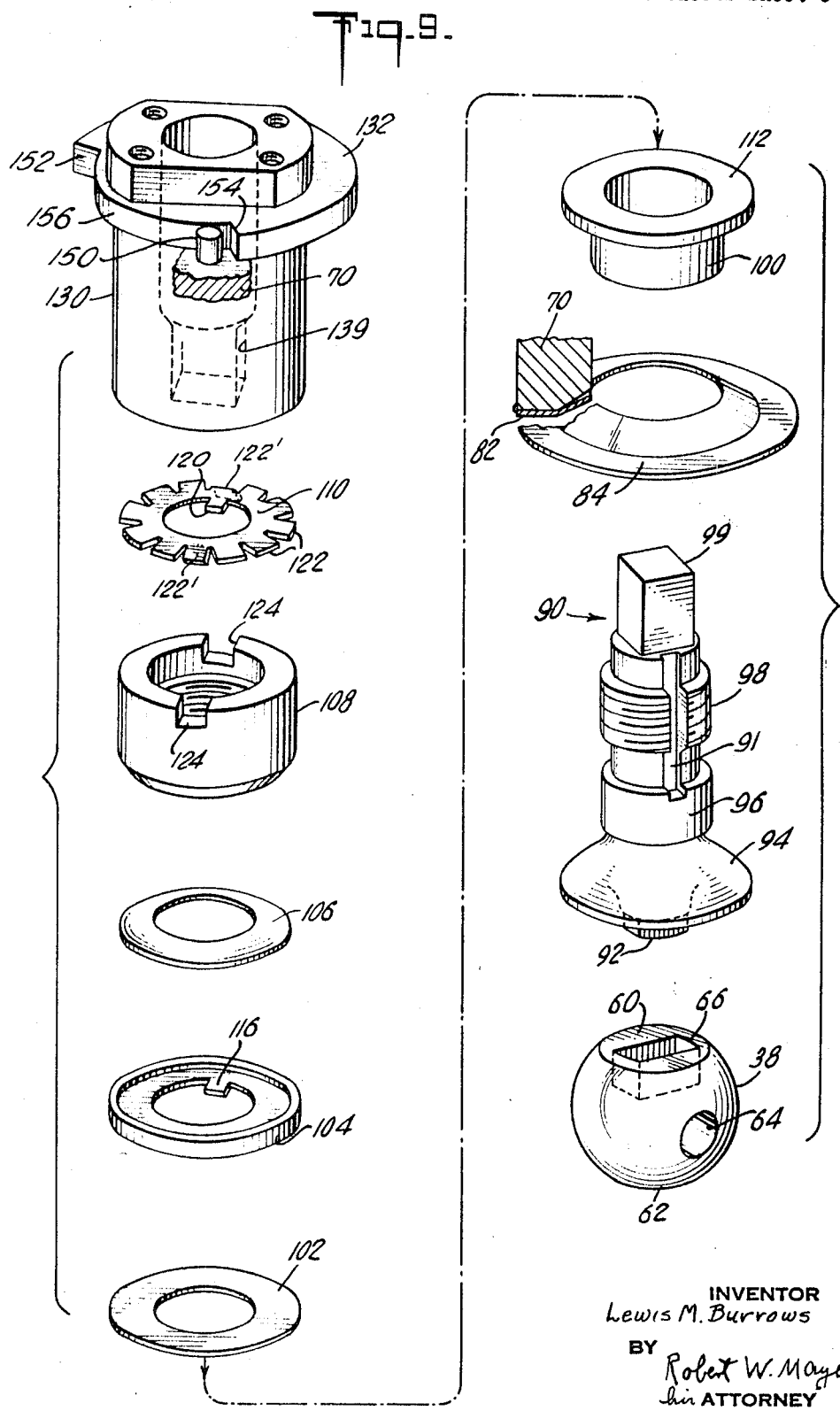

United States Patent Office 3,458,172
Patented July 29, 1969

3,458,172
BALL VALVE
Lewis M. Burrows, Alexandria, La., assignor to Dresser Industries, Inc., Dallas, Tex., a corporation of Delaware
Filed May 26, 1966, Ser. No. 553,210
Int. Cl. F16k 5/06, 5/20, 27/06
U.S. Cl. 251—174                                    11 Claims

ABSTRACT OF THE DISCLOSURE

A ball valve having flexible metallic seats for the bonnet and passage seals preferably of material suitable for high-temperature service.

---

This invention relates to ball valves and, more particularly, to a ball valve constructed for use under high temperature and pressure conditions.

Although ball valves have many desirable features, such as compactness, low weight, and good flow characteristics, they are not used presently in any appreciable amount in applications involving high temperatures, such as over about 450° F. This is because of the problems involved in making a seat for the ball valve member which will maintain effective seating action at high temperatures and pressures and because of the problem involved in providing an effective valve stem seal. In the prior valves, the packing gland for the valve operating stem cannot withstand the high temperature and pressure conditions.

It is the general object of this invention to provide a ball valve for use under high temperature and high pressure conditions, such as for example, 2500 p.s.i. at 1000° F. In accordance with this object of the invention there is provided a high temperature seat construction comprising a flexible metal seat facing arranged to cooperate with the ball valve member so as to provide and maintain an effective seating action at high temperature and pressure conditions. Also, there is provided a stem seal construction which avoids the use of gland packing and is usable at high temperatures and pressures.

The above and other objects of the invention will become apparent from a consideration of the following description in conjunction with the drawings, in which:

FIGURE 5 is an enlarged fragmentary view illustrating a ball valve seat and the valve stem seal of the valve shown in FIGURE 1;

FIGURE 6 is a fragmentary section taken on lines 6—6 of FIGURE 5;

FIGURE 7 is a fragmentary section taken on lines 7—7 of FIGURE 5;

FIGURE 8 is an enlarged fragmentary section illustrating the ball valve seat; and FIGURE 9 is an exploded view of the bonnet closure and the stem seal portion of the ball valve shown in FIGURE 1.

Figure 1:
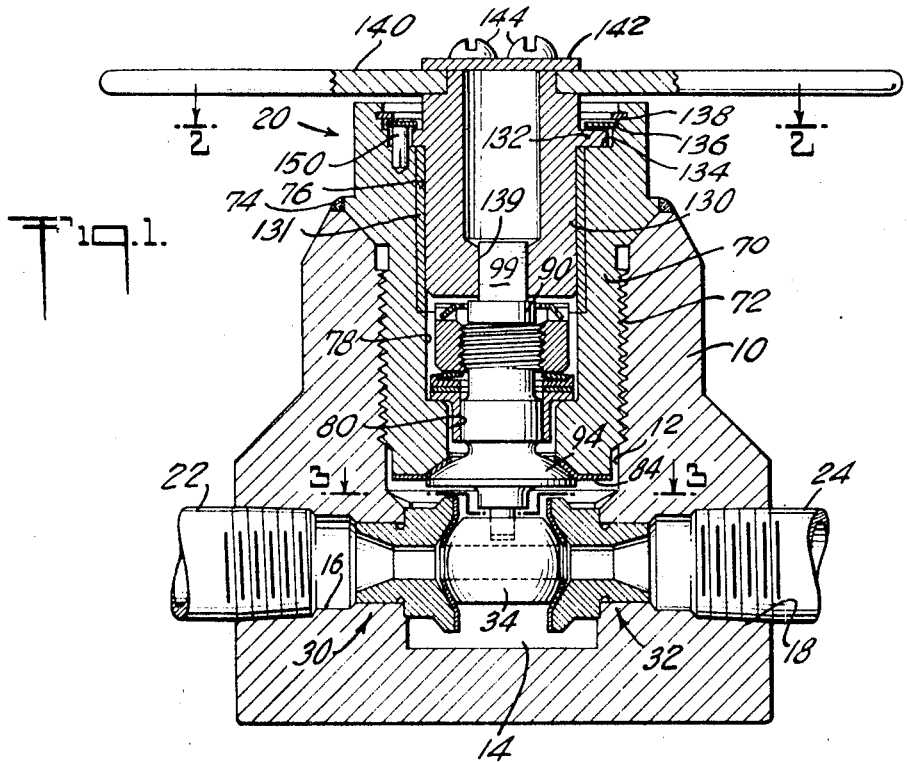
FIGURE 1 is a vertical section of a ball valve in accordance with the invention.

Referring to the drawings, the ball valve in accordance with the invention comprises a valve body 10 having a cylindrical top opening 12, a cylindrical central chamber 14 and a pair of oppositely disposed and aligned horizontal passages 16 and 18 extending outwardly from the central chamber 14 to the exterior of the body 10. The top opening 12 and the central chamber 14 are concentrically arranged on a vertical axis, the diameter of chamber 14 being less than the diameter of opening 12 as is shown in FIGURE 1. A bonnet assembly, indicated generally at 20, is mounted in the top opening 12 of the body 10 and serves to close the opening 12 and support the operating stem of the valve as will be described more fully hereafter. The passages 16 and 18 are threaded at their outer portions for threaded connection to pipe sections 22 and 24 in accordance with conventional practice. Either of the passages 16 and 18 may serve the valve inlet or the valve outlet since the flow through the valve may be in either direction.

Figure 4:
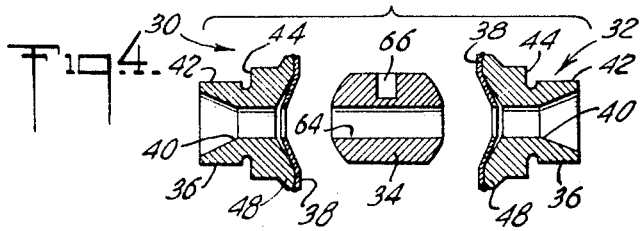
FIGURE 4 is an exploded view illustrating the components of the seating arrangement of the ball valve of FIGURE 1.

Referring now particularly to FIGURE 4, the valve assembly comprises three parts, namely, a pair of seat assemblies 30 and 32 and a ball valve member 34. Each of the seat assemblies 30 and 32 consists of a seat ring 36 and an annular seat facing 38. Each ring 36 has a central passage 40 extending axially therethrough and a reduced diameter portion 42 adapted to be received in a cooperating portion of the passages 16 and 18 adjacent to the central chamber 14 as is best shown in FIGURES 1 and 5. The rings 36 are provided with annular shoulders 44 which cooperate with shoulder portions 46 formed in the body 10 around the inner ends of the passages 16 and 18 for positioning the rings 30 and 32 in the valve body 10.

Each ring 36 is provided with an annular flange portion 48 extending radially outwardly. The annular seat facings 38 are secured to the rings 36 by a suitable high pressure seal weld 50 in the region around the periphery of the flange 48 and the outer diameter of the seat facing 38 as is best shown in FIGURE 8. This arrangement provides a very effective seal between the ring and the seat facing.

Each ring 36 is secured in position by a high pressure seal weld 52 around the periphery of the outer end of the ring 36 whereby there is provided an effective seal between each ring 36 and the body 10. It will be noted that both of the welds 50 and 52 can be formed easily, the weld 50 being made before the seat assemblies 30 and 32 are positioned within the passage 16 and 18, and the weld 52 being performed with the seat assemblies 30 and 32 in place by access through the outer ends of the passages 16 and 18. Accordingly, good welds may be made and this results in good seals being provided at the corresponding locations.

As is best shown in FIGURE 8, the end of each ring 36 adjacent the seat facing 50 comprises an outer flat annular portion 54, a conical inner portion 56 joined by a rounded annular portion 58. This configuration permits the deflection of the seat facing 38, which also comprises an annular outer rim portion and a conical inner portion, to the position in which it cooperates with the ball 34.

The ball 34 has a spherical surface and is cut at chordal planes parallel to a ball axis to provide parallel surfaces 60 and 62. A cylindrical central fluid passage 64 extends diametrically through the ball 34 and conforms generally to the size of the passages 40 in the region adjacent to the passage 64, the passage 64 providing communication between the passages 40 when the valve is in the open position shown in FIGURES 1 and 5. The ball 34 is provided with a straight-sided groove 66 (see FIGURE 3) extending downwardly from the upper surface 60 and adapted to be engaged by the lower end of the valve operating stem as will be described hereafter.

As is apparent from FIGURE 5, the diameter of the ball 34 is substantially greater than the spacing between the opposed flat annular portions of the seat facings 38. Obviously, the ball 34 must pass through this spacing to place it in the operating position shown in the drawings. Accordingly, the space between the surfaces 60 and 62 is made less than the spacing between the seat facings 38 so that the ball 34 can be inserted with the surfaces 60 and 62 held vertically and facing the seat facings 38 and then turned to the position shown in the drawings.

The diameter of the ball 34 is greater than the spacing between the conical portions of the seat facings 38 as measured through the center of the ball when the seat facings 38 are in their normal unflexed or unstressed condition as mounted on the rings 36. Thus, when the ball 34 is placed in the operating position, the seat facings 38 will deflect toward the ends of the rings 36 to accommodate the ball 34 and hold the same in the operating position. This deflection is illustrated in FIGURE 8 where the unstressed condition of the seat facings 36 is shown in dashed lines. The amount of deflection is relatively small, such as about two to three degrees, but this serves to provide a preloading condition between each of the seat facings 38 and the spherical surface of the ball 34. Accordingly, there is provided an effective valve sealing action when the valve is in the closed position.

In view of the high temperature and pressure conditions under which the ball valve in accordance with the invention is to be used, the choice of the materials used for various parts is extremely important. The valve body 10 may be of a suitable high temperature resistant steel. Ball 34 may be of a hardened stainless steel or of a suitable stellite alloy such as Haynes Stellite Alloy No. 6 manufatcured by the Haynes Stellite Company, a division of Union Carbide, Kokomo, Ind. Since the prevention of galling between the ball on the valve seats is an important object of the invention it is essential that the seat facings 38 be made from a suitable material. The seat facings should be of a strip of metal capable of withstanding the temperatures involved and having the properties of flexibility, good wear properties, corrosion resistance, and reasonable ductility at high temperatures. In other words, the seat facings should have "high temperature resistance," which, as used herein, is defined as resistance to oxidation, corrosion, erosion, abrasion, and having high creep strength when subjected to high temperature conditions. An example of a material suitable for use as a seat facing is a stellite such as Haynes Stellite Alloy No. 6B manufactured by the Haynes Stellite Company, Kokomo, Ind. The rings 36 are also preferably made of a high temperature resistant material such as a suitable stainless steel.

By reason of the above-described construction, the area of contact between the ball 34 and a seat facing 38 will be an annular band rather than a line contact. Accordingly, an effective seal is provided.

The bonnet assembly 20 comprises a generally cylindrical body 70 which is mounted within the top opening 12 at a threaded portion 72 and is seal welded to the body 10 at a circular weld 74. The body 10 and the bonnet body 70 are provided with mating conical parts which extend inwardly from the weld 74 and act to limit the positioning of the bonnet and provide for the building up of an axial load on the threaded joint. The bonnet body 70 comprises three concentric bores, namely, an upper bore 76, an intermediate bore 78 and a lower bore 80, providing a central passage extending axially through the body 70.

The lower end 82 of the bonnet body 70 is provided with a flat annular outer portion joined with a conical inner portion similar to the end construction of the rings 36, and has an annular seat facing 84 mounted thereon. The seat facing 84 is secured to the end 82 of the bonnet body 70 by a pressure seal weld 86 in the region around the periphery of the end 82 and the outer diameter of the seat facing 84. This provides a good seal between the bonnet body 70 and the seat facing member 84.

Figures 2, 3:
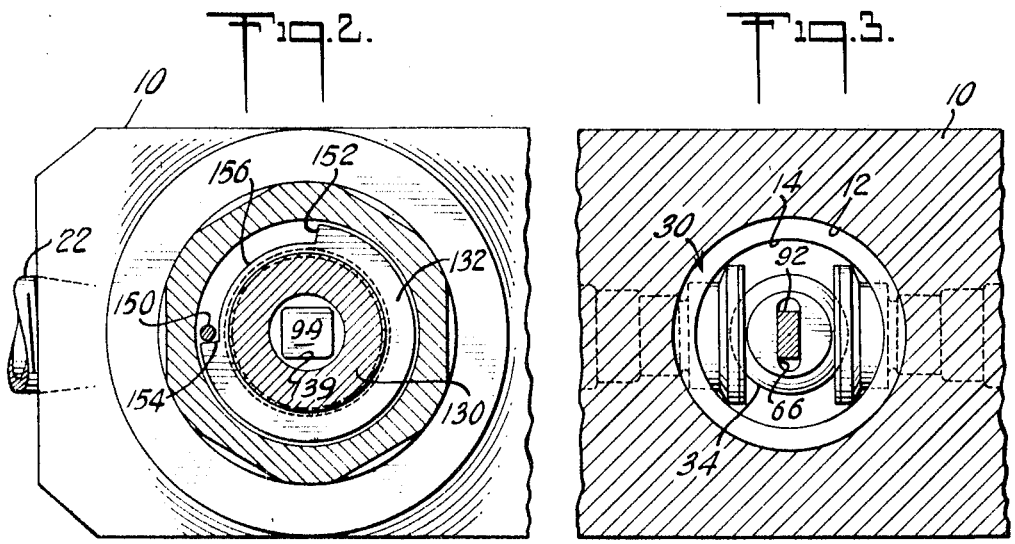
FIGURE 2 is a fragmentary plan section taken on lines 2—2 of FIGURE 1.
FIGURE 3 is a fragmentary section taken on lines 3—3 of FIGURE 1.

A valve operating stem 90 is mounted within the central passage in the bonnet body 70 and has a straight-sided projection 92 at its lower end. The projection 92 extends within the groove 66 in the ball 34 to provide engagement between the stem 90 and the ball 34. By this arrangement when the valve stem 90 is rotated it operates the ball 34 between its open and closed positions. As shown in FIGURE 3, the groove 66 is longer than projection 92 so as to permit a small amount of relative movement.

The stem 90 has a flange portion providing a spherical surface 94 arranged to contact the conical portion of the seat facing 84 to provide a seal between the stem 90 and the seat facing member 84 and thereby seal the central passage of the bonnet body 70.

Means are provided for mounting the stem 90 on the bonnet body 70 so that the projecting portion 92 is engaged within the groove 66 and the spherical portion 94 is in sealing contact with the seat facing member 84. Such means comprises a group of parts including a stem guide bushing 100, a wear washer 102, a retaining ring 104, a bell washer 106, and adjusting nut 108 and a lock ring 110.

Referring to FIGURE 5, the stem guide bushing 100 has a tubular construction and contacts at its inner diameter a cylindrical portion 96 of the stem 90. The stem guide bushing 100 has an annular flange 112 at its upper end arranged to contact an annular shoulder 114 formed in the bonnet body 70 between the lower bore 80 and the intermediate bore 78. The wear washer 102 is annular and is positioned between the upper face of flange 112 and the annular retaining ring 104. The retaining ring 104 has a radially inwardly projecting tab 116 which extends into a longitudinally extending slot or key-way 91 in the stem 90 whereby the retaining ring 104 and the stem 90 are keyed together against relative rotational movement.

The conical bell washer 106 is positioned between the upper face of the retaining ring 104 and the lower end of the adjusting nut 108, retaining ring 104 being provided with an upwardly projecting rim to contain bell washer 106 against lateral movement off the upper face thereof. The adjusting nut 108 is a hollow cylinder and is internally threaded for engagement with a threaded portion 98 of the stem 90. Thus, by turnnig the adjusting nut 108 downwardly into contact with the top of the bell washer 106, the stem 90 is raised upwardly. The position of the stem is adjusted, by rotation of the adjusting nut 108, to that shown in FIGURE 5 wherein the bell washer 106 has been deflected or flattened and the spherical portion 94 has contacted the seat facing 84 to deflect the same upwardly a few degrees from its normal position in a manner similar to the deflection of the seat facings 38 by ball 34. When the desired deflection of seat facing 84 is achieved, the adjusting nut 108 is secured in its adjusted position by the lock ring 110. The lock ring 110 is keyed to the stem 90 by means of its inwardly projecting tab 120, which tab engages within the key-way 91 whereby the lock ring 110 is held against rotational movement relative to the stem 90. The lock ring 110 is also engaged with the adjusting nut 108. To this end, the lock ring 110 is provided with a plurality of radially outwardly projecting tabs 122 spaced circumferentially about its periphery. Two of these tabs, designated 122', are bent downwardly into diametrically opposed recesses 124 in the upper end of the adjusting nut 108. Accordingly, the lock ring 110, the adjusting nut 108, the bell washer 106, and the retaining ring 104 are all mounted for rotation with the stem 90 and serve to maintain the vertical position of the stem 90 relative to the bonnet body 70 under the bias provided by the spring force of the deflected bell washer 106. The parts are adjusted so as to provide a preloaded condition between the spherical portion 94 and the seat facing 84 which condition will exist independently of any fluid pressure condition within the central chamber 14 acting on the portion of the valve stem 90 in such chamber. It is noted that the area of the valve stem 90 within the chamber 14 bounded by the line of contact of the spherical surface 94 of the stem and seat 84 will be responsive to the fluid pressure within the chamber to increase the contact pressure between the spherical portion 94 and the seat facing 84 as the chamber pressure increases.

Means are provided for moving the valve stem 90 between its two operative positions. Such means comprise a bonnet bushing 130 positioned within the upper bore 76 of bonnet body 70 with a tubular wear bushing 131 between bore 76 and the outer wall of bushing 130. Bushing 130 is provided with an annular flange 132 which is arranged to rest on an annular shoulder 134 formed in the top of the bonnet body 70. The bushing 130 is secured in this position by a washer 136 and a retaining ring 138 which cooperate with the flange 132 to limit the upper movement of the bushing 130. A square hole 139 is formed in the lower end of bushing 130 and is arranged to receive a correspondingly shaped portion 99 on the upper end of the valve stem 90. Thus, bushing 130 and stem 90 are secured together for conjoint rotational movement within the bonnet body 70. A handle 140 is mounted on the bushing 130 by means of a retaining plate 142 secured to the top of bushing 130 by four screws 144 which threadedly engage the bushing 130.

Stop means are provided for limiting the valve stem to a 90° rotational movement. Such means comprise a pin 150 and a pair of radially extending stop shoulders 152 and 154 formed at the end of an arcuate cut-away portion 156 of the flange 132. The pin 150 is secured in bonnet body 70 and projects upwardly from the shoulder 134 thereon into the cut-away portion 156 of the flange 132. Accordingly, the stop shoulders 152 and 154 move into contact with the pin 150 as the bushing 130 is rotated within the bonnet body 70. Since the bushing 130 is secured to the valve stem 90 for conjoint rotational movement, the stem 90 is also limited to the 90° rotational movement. The stop pin 150 must be located in the bonnet body 70 after the bonnet assembly 20 has been assembled in the valve body 10 and parts positioned such that the pin 150 will engage stop shoulder 154 when passage 64 in ball 34 is aligned with passages 40 of the seat assemblies. Stop 152 then limits movement of stem 90 to provide sealing of the ball 34 and seat facings 38 in a closed position.

As to the materials for the bonnet assembly, the seat facing 84 should be made of the same material as the seat facings 38, namely, a suitable stellite. The stem 90 also should be made of the material for high-temperature service. For example, the cobalt-base alloy known as Haynes Alloy No. 25, manufactured by the Haynes Stellite Company of Kokomo, Ind., is a suitable material. Other parts should be made to withstand the high temperatures involved, for example, a suitable material for the bonnet body 70 is a high temperature resistant steel and a suitable material for the bell washer 106 is Haynes Alloy No. 25 which can withstand the high temperatures involved without failure.

In the use of the ball valve in accordance with the invention, the valve is placed in the open position by moving the handle 140 to the position shown in FIGURE 1. This places the passage 64 of the ball 34 in coaxial alignment with the fluid passages 16 and 38 by way of the central opening in the annular facings 38 and the passages 40 of the seat assemblies 30 and 32. In this position of the flow passages, the flow between the pipes 20 and 24 is unobstructed. The circular contact areas between the ball 34 and the seat facings 38 effectively blocks flow to the chamber 14.

When it is desired to close the valve, the handle 140 is rotated a quarter turn in the counterclockwise direction as viewed from the top of the valve, this movement being limited by the contact of stop 152 with the pin 150 (FIGURE 2). In this position, the passage 64 is no longer in communication with the fluid passages 16 and 18 and by reason of the sealing contact between the ball 34 and the seat facings 38, the flow through the valve is closed off.

Since the ball 34 will be subjected to a higher pressure on the high pressure side thereof, the ball 34 may be moved laterally towards the low pressure side. It will be apparent that by reason of the support of the ball 34 by the flexible seat facings 38, the ball valve in accordance with the invention will be able to accommodate such a condition and to withstand the same without any danger of injury to the parts. The parts are constructed to accommodate such movement without any hindrance, for example, the length of slot 66 is greater than the length of the lower portion 92 of the stem 90 to permit relative movement therebetween (see FIGURE 3).

As the valve is moved between the open and closed positions, there will be leakage of fluid into the chamber 14. However, the bonnet assembly 20 provides an effective, high temperature and pressure resistant seal. For example, the bonnet body 70 is sealed with the valve body 10 by reason of the weld 74 and threaded engagement therebetween at 72. Moreover, the stem 90 is sealed to the bonnet body 70 by means of the cooperation between spherical portion 94 and the seat facing 84. Furthermore, this sealing arrangement is capable of withstanding high temperature and pressure conditions by reason of its construction and the material used.

It will be evident that various changes may be made in the construction and arrangement of parts without departing from the scope of the invention wherefore it is not desired to be limited except as required by the following claims.

What is claimed is:

1. In a valve comprising a valve body having a chamber, an opening to the valve exterior communicating with said chamber, and means defining a pair of fluid passages communicating with said chamber from the exterior of said valve body, a valve seat at the inner end of each of said fluid passages, a valve member cooperating with said valve seats for controlling flow between said fluid passages, and a bonnet assembly mounted on said valve body for closing said opening, said bonnet assembly including a body, a valve operating stem mounted for rotational movement in said bonnet body and in engagement with said valve member for operating the same between its flow controlling positions, wherein the improvement comprises a seat on said bonnet body encircling and at least partially engaging said valve stem to provide a seal between said valve stem and said bonnet body, said bonnet seat comprising an annular, flexible metallic facing mounted on said bonnet body, said facing encircling said valve stem and being mounted for deflection toward and away from said chamber, said valve stem portion engaging said annular facing being mounted to cause a deflection thereof.

2. In the improvement according to claim 1 further comprising means for preloading the sealing contact between said bonnet seat and said portion of said valve stem.

3. In the improvement according to claim 2 further comprising means providing a seal between said bonnet body and said valve body including portions on said valve body and said bonnet body in threaded engagement.

4. In the improvement according to claim 2 wherein said bonnet seat comprises an annular, flexible metallic facing mounted on the inner end of said bonnet body adjacent said chamber, said facing encircling said valve stem and being mounted for deflection toward and away from said end of said bonnet body, said valve stem portion engaging said annular facing and being mounted to cause a deflection thereof to provide said preloading condition.

5. In the improvement according to claim 1 wherein said metallic bonnet seat facing is made of stellite material having high temperature resistance.

6. In the improvement according to claim 2 wherein said valve stem portion is spherical, and said means for preloading the sealing contact between said bonnet seat and said portion of said valve stem comprises a spring biasing said valve stem portion towards said seat facing to deflect the same.

7. In a valve according to claim 1 wherein said valve seats cooperating with said valve member comprise an annular, flexible metallic facing mounted for deflection, and said valve member has a spherical portion mounted between said valve seat metal facings for contact therewith.

8. In a valve according to claim 7 wherein said valve member deflects said valve seat facings from their normal position to provide a preloaded condition.

9. In a valve according to claim 8 wherein said annular metallic valve seat facings are made of a stellite having a high temperature resistance and flexibility at high temperature conditions.

10. In a valve according to claim 1 further including ring members mounted at the end of each of said fluid passages at a location adjacent said chamber, and wherein said valve seats cooperating with said valve member comprise an annular metallic facing mounted on the inner ends of said rings for deflection, and said valve member has a spherical portion mounted between said metal facings for contact therewith in circular areas.

11. In a valve according to claim 10 wherein said annular metallic valve seat facings are secured to said rings by a weld at the outer periphery thereof.

References Cited

UNITED STATES PATENTS

| | | | |
|---|---|---|---|
| 2,573,177 | 10/1951 | Bohlen | 251—174 X |
| 2,696,967 | 12/1954 | Wilson | 251—174 |
| 2,777,664 | 1/1957 | Bryant | 251—174 |
| 2,817,545 | 12/1957 | Uhler | 251—214 X |
| 2,890,856 | 6/1959 | Clade | 251—174 |
| 2,946,552 | 7/1960 | Mancusi | 251—334 X |
| 2,984,449 | 5/1961 | LeClair | 251—172 |
| 3,047,007 | 7/1962 | Lunken | 251—172 X |
| 3,151,837 | 10/1964 | Bentley-Leek | 251—214 |
| 3,186,681 | 7/1965 | Lowrey | 251—214 |
| 3,218,024 | 11/1965 | Kroekel | 251—172 X |
| 3,259,358 | 7/1966 | Tripoli | 251—214 |

CLARENCE R. GORDON, Primary Examiner

U.S. Cl. X.R.

137—315; 251—214, 315, 368